Dec. 27, 1927.
W. H. PHILLIPS
TRUCK
Filed Nov. 24, 1926
1,654,188
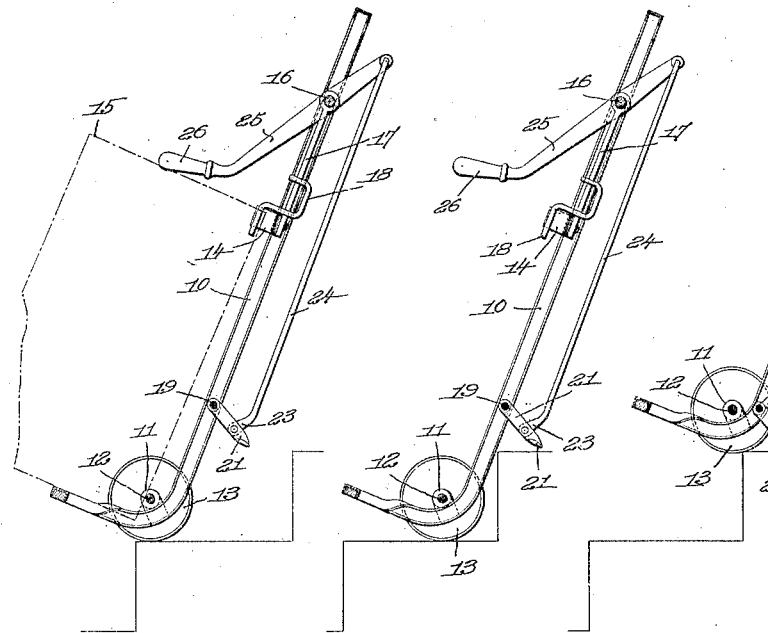
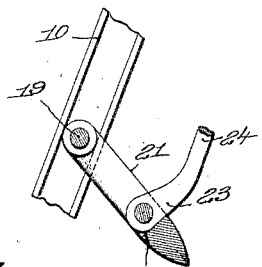
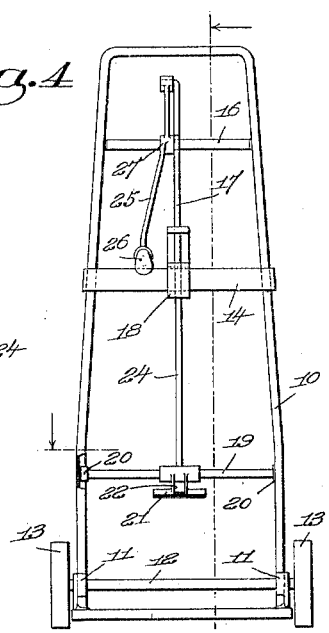
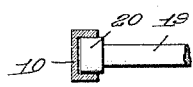
Witness
Frederick S. Greenleaf.
Inventor
Walter H. Phillips
by his attorneys
Van Everen Fish
Hildreth & Cary Patented Dec. 27, 1927.

1,654,188

UNITED STATES PATENT OFFICE.

WALTER H. PHILLIPS, OF ARLINGTON, MASSACHUSETTS.

TRUCK.

Application filed November 24, 1926. Serial No. 150,549.

The present invention relates to an improvement in stair climbing trucks.

The object of the invention is to produce a truck for carrying goods up stairs. It finds a considerable use in taking ash barrels from the cellar. To this end the present invention consists in the stair climbing truck hereinafter described and particularly defined in the claims.

In the accompanying drawings illustrating the preferred form of the invention, Figs. 1, 2, and 3 are medial sections of a truck shown in different positions on stairs, thus, Fig. 1 rolling along the tread; Fig. 2 in position to engage a step, and Fig. 3 the position of the parts after the truck has been raised to the next tread; Fig. 4 is a front elevation of the truck; and Figs. 5 and 6 show details of construction hereinafter referred to.

The truck has a frame 10, and may be made of channel iron with the open side inward. The frame is provided at 11 with journals for the shaft 12, having the wheels 13 upon which the truck may roll. A transverse member 14 extends from side member to side member of the frame, and affords a support for the top of the barrel. The barrel 15 is shown in dash and dot lines in Fig. 1. A cross shaft 16 is fastened between the side members of the frame. A bar 17 has an eye at its upper end which embraces this cross shaft. The lower end of the bar 17 is secured to the center of the cross piece 14. Upon the bar 17 is mounted a barrel clip 18, so that it may slide up and down on the bar, and its lower end may engage the top of a barrel and hold it on the truck.

A cross head 19 is provided near the lower part of the truck, which has enlarged heads 20 (see Fig. 6) received in the open channel of the frame 10. This cross head is adapted to slide up and down in the grooves in the two channels of the side members, the portions of the side members between which the cross head slides being parallel to each other, as shown at the bottom of Fig. 4. The cross head carries a stair prong 21 secured to the middle of the cross head. This prong 21 is provided with a slot 22 which receives the lower end 23 of the link 24. This link is bent at the lower end, as shown in Fig. 5, and the flat portion of the link engages the end of the slot 22, as shown in Fig. 5, thereby preventing the prong from turning to an angle extending upward from the cross head.

The link constitutes means for actuating the prong and for moving the prong and cross head up and down on the frame. The upper end of the link is pivotally connected to one end of a hand lever 25, provided at its opposite end with a handle 26. This hand lever 25 is pivotally mounted on the cross shaft 16, being conveniently provided with a hub 27 which turns on the cross shaft 16. Conveniently the cross shaft consists of a stiff rod extending from frame to frame, bearing two pieces of iron pipe, one of which extends from the right hand cross member, as viewed in Fig. 4, to and flush with the far side of the eye of the rod 17, and the other of which extends from the left hand cross frame, as viewed in Fig. 4, to the hub 27. These pipes on the bar support the hub with the hand lever in proper position on the bar.

The truck is operated in climbing stairs as follows: Assuming a barrel to be carried by the truck, the barrel is tipped away from the truck slightly and the toe of the truck is pushed under the barrel. Then the hook 18 is dropped over the top of the barrel and the operator, by placing his foot against the wheel shaft 12, may pull backwardly upon the upper end of the frame and thereby lift the barrel off the floor and tip it into the position shown in Fig. 1. The truck will then be backed up against the stairs with the handle in the position it occupies in Fig. 1. While in this position the prong will be above the ordinary height of riser of the stairs. The truck will be rolled along until it occupies the position shown in Fig. 2, and then the user will take hold of the handle 26 and turn it from the position indicated in Fig. 2 to the position indicated in Fig. 3. The turning of the hand lever will be done with one hand while the truck is steadied in position by the other hand. As the hand lever is pulled upon the prong takes upon the step above the level of the wheels of the truck, and the lever pulls upward upon the cross shaft 16, finding its resistance to such upward pull in the pressure of the prong against the step. The cross head carrying the prong stands fast, and the truck slides upward on the cross head. When the truck wheels reach and rest upon a step, the hand lever will be thrown down to the position shown in Fig. 1, thereby raising the prong with respect to the wheels to the position shown in that figure. The truck will then be rolled back to the next step, the lever again pulled upon, and the truck lifted to that step, and so on to the top of the steps, whereupon the lever will be thrown down and the truck may be used to roll the barrel to the place where it is to be put.

It is to be observed that the cooperation of the bent end 23 of the link 24 with the prong prevents the prong from turning to a position projecting upwardly from the cross head. In other words, when the prong is lifted by depressing the hand lever, the cross head must maintain a constant position with relation to the link. When the hand lever is depressed to its extreme position, the link 24 strikes the cross shaft 16 or the hub 27 or the eye on the bar 17, and the upper end of the link 24 being moved toward the frame causes the lower end of the link to be swung outwardly, thereby causing the prong to be projected rearwardly. Simple provision is therefore made for making sure that the prong projects rearwardly in position to engage a step.

Having thus described the invention, what is claimed is:

1. A truck having, in combination, a frame having side members and a toe, wheels supported on the frame, the lower portion of the side members being channelled on their inner sides, a cross-head having its ends pivotally and slidingly received in the open sides of the channels, a stair prong mounted on the cross-head, a hand lever pivotally mounted on the upper portion of the frame, a connection between the prong and the hand lever for operating the prong by the lever to lift the frame on the prong as a pivot.

2. A truck having, in combination, a frame having an upright portion and a toe, wheels supported on the frame, a slide mounted on the lower portion of the upright portion of the frame, a stair prong carried by the slide, and means for reciprocating the slide on the frame and swinging the prong rearwardly to engage a stair tread.

3. A truck as defined in claim 2 in which provision is made to prevent the prong from swinging upwardly upon the slide beyond a predetermined point.

WALTER H. PHILLIPS.